(12) United States Patent
Kurtin

(10) Patent No.: US 10,394,056 B2
(45) Date of Patent: Aug. 27, 2019

(54) ADJUSTABLE FOCUS SPECTACLES WITH NON-CIRCULAR LENSES

(71) Applicant: Stephen Kurtin, Sherman Oaks, CA (US)

(72) Inventor: Stephen Kurtin, Sherman Oaks, CA (US)

(*) Notice: Subject to any disclaimer, the term of this patent is extended or adjusted under 35 U.S.C. 154(b) by 0 days.

(21) Appl. No.: 15/761,059

(22) PCT Filed: Sep. 30, 2016

(86) PCT No.: PCT/US2016/055042
§ 371 (c)(1),
(2) Date: Mar. 16, 2018

(87) PCT Pub. No.: WO2017/059381
PCT Pub. Date: Apr. 6, 2017

(65) Prior Publication Data
US 2018/0231802 A1  Aug. 16, 2018

Related U.S. Application Data

(60) Provisional application No. 62/236,811, filed on Oct. 2, 2015.

(51) Int. Cl.
*G02C 7/08* (2006.01)
*G02B 3/12* (2006.01)
*G02C 7/00* (2006.01)
*G02C 7/02* (2006.01)

(52) U.S. Cl.
CPC .............. *G02C 7/085* (2013.01); *G02B 3/12* (2013.01); *G02C 7/00* (2013.01); *G02C 7/02* (2013.01)

(58) Field of Classification Search
CPC . G02C 7/085; G02C 7/00; G02C 7/02; G02B 3/12; G02B 3/14
USPC .................................................. 351/159.68
See application file for complete search history.

(56) References Cited

U.S. PATENT DOCUMENTS

| 4,913,536 A | 4/1990 | Barnea |
| 5,138,494 A | 8/1992 | Kurtin |
| 5,371,629 A | 12/1994 | Kurtin et al. |
| 5,668,620 A | 9/1997 | Kurtin et al. |

(Continued)

OTHER PUBLICATIONS

International Search Report in the parent PCT application No. PCT/US2016/055042, dated Feb. 3, 2017.

(Continued)

*Primary Examiner* — Wen Huang
(74) *Attorney, Agent, or Firm* — Chen Yoshimura LLP

(57) ABSTRACT

Adjustable focus spectacles using fluid displacement lens units with bipolar membrane distension and a non-circular periphery. The lens unit includes front and rear mounting rings, front and rear distensible membranes respectively mounted on the two mounting rings, a ring shaped flexible seal disposed between the two mounting rings along their peripheries, and front and rear clamping rings for respectively clamping the flexible seal to the front and rear mounting rings. The sealed space defined by the two distensible membranes and the flexible seal is filled with an optical fluid. The two mounting rings are pivotally coupled together at a pivot located along the periphery of the lens unit. A biasing spring is affixed to the front and rear mounting rings at a second location on their periphery to urge them away from each other. An assembly process for the lens unit is also disclosed.

13 Claims, 2 Drawing Sheets

(56) References Cited

U.S. PATENT DOCUMENTS

| | | | |
|---|---|---|---|
| 6,053,610 | A | 4/2000 | Kurtin et al. |
| 7,008,054 | B1 | 3/2006 | Kurtin et al. |
| 8,708,487 | B2 | 4/2014 | Kurtin |
| 8,777,408 | B2 | 7/2014 | Kurtin |
| 8,888,276 | B2 | 11/2014 | Kurtin et al. |
| 2008/0084532 | A1 | 4/2008 | Kurtin |
| 2010/0277686 | A1 | 11/2010 | Kurtin |
| 2013/0229617 | A1 | 9/2013 | Kurtin |

OTHER PUBLICATIONS

IPRP in the parent PCT application No. PCT/US2016/055042, dated Apr. 3, 2018.

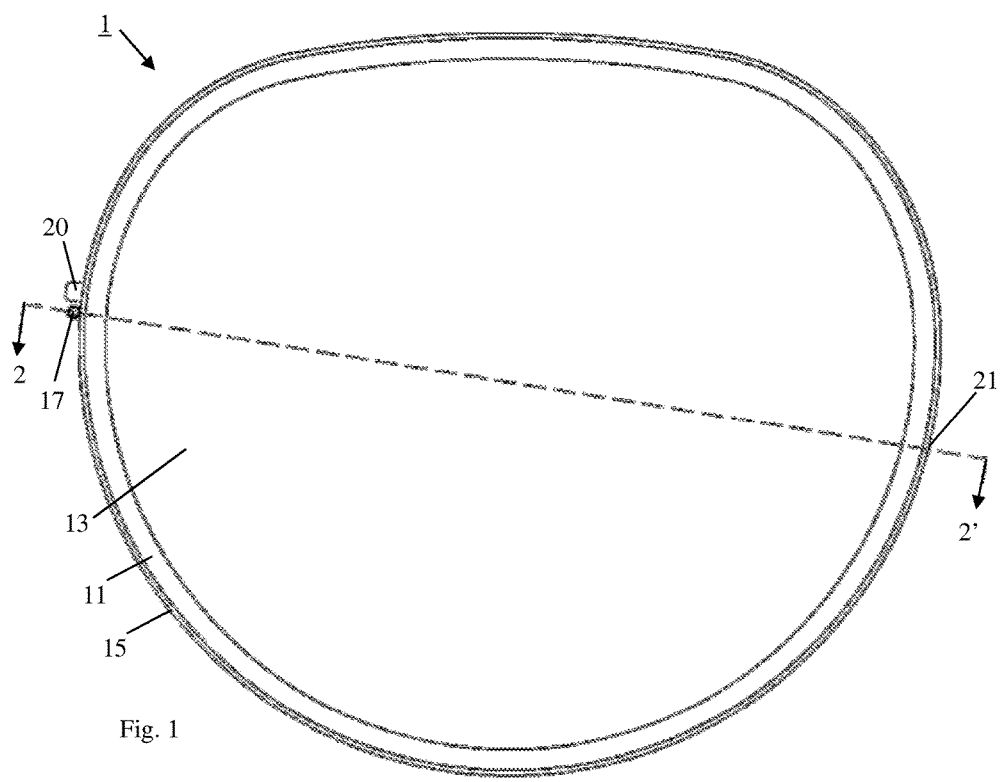
Fig. 1
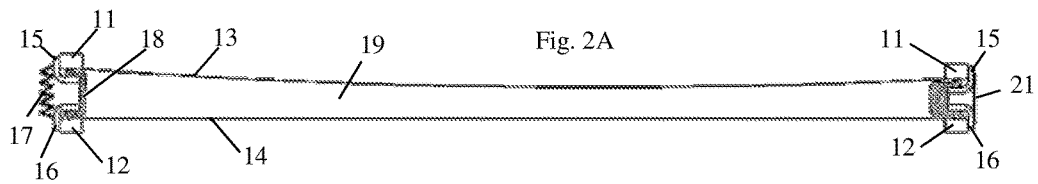
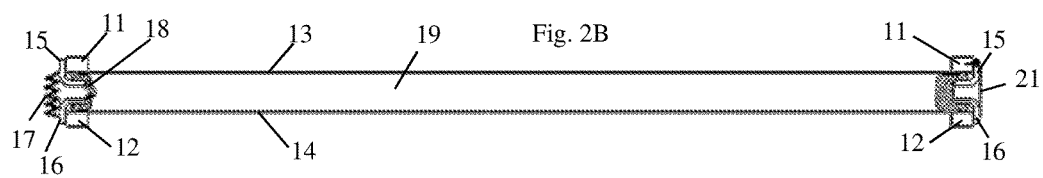
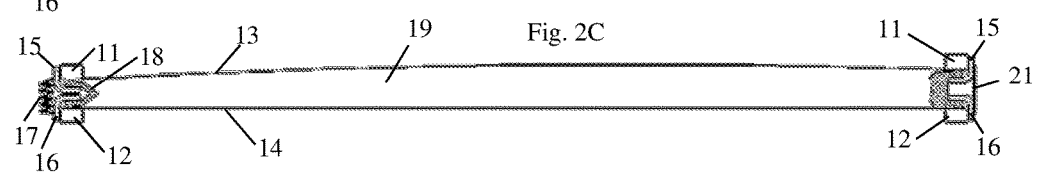

ADJUSTABLE FOCUS SPECTACLES WITH NON-CIRCULAR LENSES

BACKGROUND OF THE INVENTION

Field of the Invention

This invention relates to adjustable focus spectacles, and in particular relates to adjustable focus spectacles using fluid displacement lens units with bipolar membrane distension and a non-circular periphery.

Description of Related Art

Variable focus spectacles are spectacles which provide adjustable optical power (i.e., adjustable focal length). For example, U.S. Pat. Nos. 5,138,494, 5,371,629 and 5,668,620 describe variable focal length lenses for use in spectacles. Existing fluid displacement variable focal length lenses (FDLUs) generally include a rigid rear optical surface, and a front optical surface which is a distensible elastomeric membrane. Optical fluid, which has a fixed volume, is stored in the field of view and between the elastomeric membrane and the rigid rear optical surface. Change of the optical power of the resulting fluid-filled lens is typically achieved by pivoting a support ring, which bears the rigid lens, relative to the distensible membrane, thereby changing the amount of distention of the membrane.

Change of optical power can be accomplished, for example, by a manually controlled actuator which operates pivotally to change the separation between the rigid lens and the membrane support ring. Some manually controlled actuating mechanisms for fluid displacement variable focus spectacles are described in U.S. Pat. Nos. 6,053,610, 7,008,054, 8,888,276, 8,777,408, and 8,708,487.

In many existing adjustable focus spectacles throughout the intended operating range the membrane is always distended outwardly, but to varying degree, to provide adjustable optical power. This type of adjustable focus spectacles is referred to as unipolar. For example, existing adjustable focus spectacles can utilize a distensible membrane that is somewhat inflated at 0 ADD and further inflated at maximum ADD. Hence the membrane might have a minimum curvature of +1.25 diopter and a maximum curvature of +4.00 diopter, thereby delivering a useful optical range of 2.75 diopters.

For unipolar adjustable focus spectacles, the actuator only needs to exert a compressive force to urge the rigid lens and the membrane support ring toward each other; an opposing force that urges these items to move away from each other is primarily provided by tension in the outwardly distended membrane, i.e. its inherent tendency to reduce its curvature. Some opposing force is also provided by deformation of a flexible seal, which serves to retain the optical fluid, and is disposed between and along the peripheries of the membrane support ring and the rigid lens. Actuators which only exert a compression force, and which rely on distention membrane together with deformation of the seal to provide the opposing force, are referred to as unidirectional actuators. The actuators described in the above-mentioned U.S. Pat. Nos. 6,053,610, 7,008,054, 8,888,276, 8,777,408, and 8,708,487 are unidirectional.

Bi-directional actuators are ones in which the user can urge the membrane support ring and the rigid lens to move in both relative directions, i.e., toward each other (pushing) and also away from each other (pulling). Bi-directional actuators for adjustable focus spectacles typically suffer from a lack of positional accuracy, particularly near the transition from pushing to pulling. To avoid using bi-directional actuators many existing adjustable focus spectacles are unipolar.

While unipolar adjustable focus spectacles have the advantage that they allow for the use of unidirectional actuators, they have certain drawbacks related to the relatively large peak membrane distension correspondingly required. For example, for the lens unit discussed above that operates between +1.25 and +4.00 diopters, the membrane support ring (typically the front ring) and the rigid lens support ring (typically the rear ring) are required, without undue deformation, to withstand the forces which result from displacing a quantity of fluid adequate to produce membrane curvature of +4.00 diopter. Displacement of this magnitude typically produces pressure within the lens unit of more than 0.3 psi and, for a 40 mm diameter circular lens unit, the corresponding operating force (at the operating point of the actuator) can be nearly 0.5 lb. To resist adequately the corresponding maximum torques, the front ring and rear ring must consequently be sufficiently thick and hence relatively heavy.

Bipolar adjustable focus spectacles, i.e. ones in which the distensible membrane of the lens unit can be distended in both directions (concave and convex) within the intended adjustment range of optical power, have also been described, for example in U.S. Pat. No. 5,668,620 and U.S. Pat. Appl. Pub. 2013/0229617. U.S. Pat. Appl. Pub. 2013/0229617 describes operating bipolar adjustable focus spectacles, via a unidirectional actuation mechanism together with a biasing member which urges the front ring and rear ring to move away from each other.

In the lens units shown in U.S. Pat. Nos. 5,138,494, 5,668,620, 8,777,408, and 8,708,487, and U.S. Pat. Appl. Pub. 2013/0229617, a flexible seal is provided to seal the space between the front ring and the rear ring and thereby retain the fluid. The seal is typically molded from elastomer. The cross section of the seal typically includes i) a middle portion which enables relative pivoting motion between the front ring and the rear ring, and ii) two flanges connected, respectively, to the front and rear rings in a fluid-tight manner.

SUMMARY

Embodiments of the present invention disclose improved FDLUs which enable adjustable focus eyeglasses that have a non-circular lens unit periphery without inherent excessive optical distortion, and have a structure that is relatively thin and light, and can be manufactured at low cost.

Additional features and advantages of the invention will be set forth in the descriptions that follow, and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a lens unit for variable focus spectacles, which includes: a front ring assembly, including a front mounting ring, a front distensible membrane mounted on and bonded to the front mounting ring and covering an opening of the front mounting ring, and a front clamping ring affixed to the front mounting ring; a rear ring assembly, including a rear mounting ring, a rear distensible membrane mounted on and bonded to the rear mounting ring and covering an opening of the rear mounting ring, and a rear clamping ring affixed to the rear mounting ring; wherein the front and rear ring assemblies are disposed substantially parallel to a transverse direction of the lens unit and are pivotably coupled to each other at a pivot location located along a periphery of the lens unit; a flexible seal, having a ring shape and disposed between the front and rear mounting rings along their peripheries; an optical fluid filling a sealed space defined by the front and rear distensible membranes and the flexible seal; and a biasing element, directly coupled to the front and rear ring assemblies at a peripheral location near or at an operating point located along the periphery of the lens unit and spaced apart from the pivot location, wherein when a separation between the front and rear mounting rings at the pivot location is a predetermined first distance, and a separation between the front and rear mounting rings at the operating point is a predetermined second distance, the lens unit is in a zero diopter state where the front and rear membranes are flat and parallel to each other, and wherein when the lens unit is in the zero diopter state, the biasing element is in a partially compressed state and exerts a separation force to urge a pivoting movement of the front and rear ring assemblies away from each other.

In another aspect, the present invention provides a lens unit for variable focus spectacles, which includes: a front ring assembly, including a front mounting ring, a front distensible membrane mounted on and bonded to the front mounting ring and covering an opening of the front mounting ring, and a front clamping ring affixed to the front mounting ring; a rear ring assembly, including a rear mounting ring, a rear distensible membrane mounted on and bonded to the rear mounting ring and covering an opening of the rear mounting ring, and a rear clamping ring affixed to the rear mounting ring; wherein the front and rear ring assemblies are disposed substantially parallel to a transverse direction of the lens unit and are pivotably coupled to each other at a pivot location located along a periphery of the lens unit; a flexible seal, having a ring shape and disposed between the front and rear mounting rings along their peripheries, wherein the flexible seal has a first flange portion extending substantially in the transverse direction, a second flange portion extending substantially in the transverse direction, and a middle portion located between the first and second flange portions, wherein the middle portion of the flexible seal is stretchable and deformable, wherein the first flange portion is compressed between a surface of the front mounting ring and a surface of the front clamping ring, the front ring assembly being free of any structure that pre-defines a distance between the surface of the front mounting ring and the surface of the front clamping ring, or wherein the second flange portion is compressed between a surface of the rear mounting ring and a surface of the rear clamping ring, the rear ring assembly being free of any structure that pre-defines a distance between the surface of the rear mounting ring and the surface of the rear clamping ring; and an optical fluid filling a sealed space defined by the front and rear distensible membranes and the flexible seal.

It is to be understood that both the foregoing general description and the following detailed description are exemplary and explanatory and are intended to provide further explanation of the invention as claimed.

BRIEF DESCRIPTION OF THE DRAWINGS

FIG. 1 schematically illustrates the front view of a lens unit for variable focus spectacles according to an embodiment of the present invention.

FIGS. 2A, 2B and 2C schematically illustrate cross-sections of the lens unit according to an embodiment of the present invention. FIG. 2A shows the front distensible membrane having a concave shape and the lens unit has a negative diopter. FIG. 2B shows the front distensible membrane having a flat (un-distended) shape and the lens unit has a zero diopter. FIG. 2C shows the front distensible membrane having a convex shape and the lens unit has a positive diopter.

DETAILED DESCRIPTION OF PREFERRED EMBODIMENTS

Figure 3:
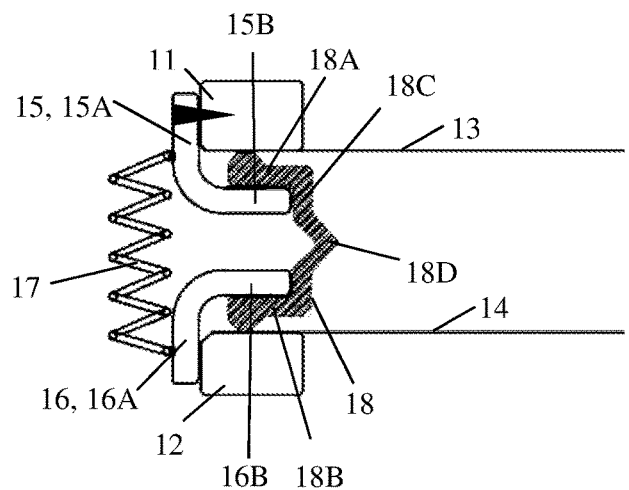
FIGS. 3 and 4 are enlarged views showing the cross-sections of a part of the lens unit of FIG. 2B.

Embodiments of the present invention provide a lens unit for variable focus spectacles. FIG. 1 schematically illustrates the front view of a lens unit 1. It is understood that the variable focus spectacles have two such lens units, although only one is shown in FIG. 1. The lens unit 1 is joined to the bridge of the spectacles, for example at a location near the structure 20 in FIG. 1 which will be described in more detail later. FIGS. 2A, 2B and 2C are schematic cross-sectional views of the lens unit taken along the line 2-2' in FIG. 1.

As shown in FIGS. 1 and 2A-2C, the lens unit 1 includes a front mounting ring 11, a rear mounting ring 12, a front distensible membrane 13, a rear distensible membrane 14, a flexible seal 18, a front clamping ring 15, and a rear clamping ring 16. The front and rear mounting rings, 11 and 12, have generally a similar shape, when projected in the direction of the front view (FIG. 1) and their positions are aligned relative each other in the side cross-sectional view (FIG. 2A-2C). The front and rear distensible membranes 13 and 14 are respectively mounted on and bonded to, and cover the opening of, the front and rear mounting rings 11 and 12. Preferably, the front and rear membranes 13 and 14 are respectively mounted on the surfaces of the front and rear mounting rings 11 and 12 that face each other. The flexible seal 18 is ring shaped and disposed between the front and rear mounting rings 11 and 12 along their peripheries. The sealed space defined by the front and rear distensible membranes 13 and 14 and the flexible seal 18 is filled with an optical fluid 19.

The front mounting ring 11 (inclusive of the membrane bonded thereto) together with the front clamping ring 15 can be collectively referred to as the front ring assembly; the rear mounting ring 12 (inclusive of the membrane bonded thereto) together with the rear clamping ring 16 can be collectively referred to as the rear ring assembly. The front and rear ring assemblies are mechanically coupled together so that they can pivot with respect to each other around a pivot 21 (e.g. a flex hinge) located along the periphery of the lens unit 1. An actuation mechanism is coupled to the front and rear mounting rings 11 and 12 at an operating point 20 (e.g. a tab affixed to the front ring assembly). In a preferred embodiment, the pivot 21 and the operation point 20 are located more or less opposite each other with respect to a center of the lens unit. A biasing element 17 (e.g. a spring, described in more detail later) is located in close proximity to the operation point 20. The cross-sectional view of FIGS. 2A-2C are taken along the line 2-2' which run through the biasing element 17 and the pivot 21. In a preferred embodiment, the operating point is located near where the bridge of the spectacle is joined to the front or rear ring assemblies.

As illustrated in FIG. 2B, the amount of the optical fluid 19 in the sealed space is such that, when the separation between the front and rear mounting rings 11 and 12 at the pivot location 21 is a predetermined first distance, and the separation between the front and rear mounting rings at the operating point 20 is a predetermined second distance, the front and rear membranes 13 and 14 are flat and parallel to each other, so that the optical fluid bound by the front and rear membranes forms a lens with two flat faces and hence having zero optical power. For convenience, this is referred to as a zero diopter state.

As illustrated in FIGS. 2A and 2C, from the zero diopter state of FIG. 2B, if the separation between the front and rear mounting rings 11 and 12 at the pivot location 21 remains unchanged and the separation between them at the operating point 20 increases from the predetermined second distance (FIG. 2A), the front and rear membranes 13 and 14 are distended inwardly forming concave shapes; as a result, the optical fluid bound by the front and rear membranes forms a concave lens having a negative optical power. This is referred to as a negative diopter state. On the other hand, if the separation between the front and rear mounting rings 11 and 12 at the pivot location 21 remains unchanged and the separation between them at the operating point 20 decreases from the predetermined second distance (FIG. 2C), the front and rear membranes 13 and 14 are distended outwardly forming convex shapes; as a result, the optical fluid bound by the front and rear membranes forms a convex lens having a positive optical power. This is referred to as a positive diopter state.

In some embodiments, the separation between the front and rear mounting rings at the pivot location 21 is permanently fixed by the structure of the hinge used at the pivot location. In some other embodiments, that separation is also adjustable.

In the embodiments shown in FIGS. 2A and 2C, the front membrane 13 is shown as having substantially larger amounts of distension than the rear membrane 14. This may be achieved by using different membranes for the front and rear membranes. For example, for the same membrane material, the amount of deformation decreases rapidly with increasing membrane thickness. Thus, when one membrane (e.g. the rear membrane 14) is substantially thicker than the other one, under any given fluid pressure the thick membrane will have a substantially smaller distension than the thinner membrane.

Using a membrane as the rear member which partly defines the sealed space, rather than using a rigid lens as in some of the patents cited earlier in this disclosure, has the advantages of reduced weight and thickness of the lens unit.

FIG. 3 is an enlarged view of the left-hand side of the lens unit shown in FIG. 2B. As shown in FIG. 3, the cross-section of the flexible seal 18 has three parts, with a middle portion 18C extending generally parallel to the optical axis of the lens unit, and two flange portions 18A and 18B extending generally in the transverse direction (i.e. the direction generally parallel to the surface of the membranes 13 and 14) one from each end of the middle portion. The flange portion 18A is adhesively bonded to its corresponding clamping ring 15, and clamped between the mounting ring 11 and the corresponding clamping ring 15. The clamping ring 15 has an L shaped cross section, with a first part 15A of the L extending generally parallel to the optical axis and affixed to the corresponding mounting ring 11 (e.g. by welding), and a second part 15B of the L extending in the transverse direction. The flange portion 18A of the seal 18 is pressed between the mounting ring 11 and the second part 15B of the clamping ring 15. The other flange portion 18B is affixed to the corresponding mounting ring 12 and clamping ring 16 in a similar manner. The first parts 15A and 16A of the two clamping rings 15 and 16 point to the front and rear of the lens unit, respectively.

In one embodiment, the lens unit is assembled as follows. (Step S1) The membrane 13 is radially pre-tensioned to a desired extent, and then bonded to the mounting ring 11, for example by an adhesive. (Step S2) The flange portion 18A of the seal 18 is bonded to the clamping ring 15; more specifically, to part 15B of clamping ring 15. (Step S3) Then, with the clamping ring 15 properly supported, the mounting ring 11 bearing the membrane 13 is placed over the flange portion 18A and inside the side wall formed by portion 15A of the clamping ring 15. (Step S4) The mounting ring 11 is then pressed against the flange portion 18A and the second part 15B of the clamping ring 15, preferably at multiple locations along its periphery. A desired amount of force is applied at each of the pressure points. The flange portion 18A is thereby compressed between the mounting ring 11 and the clamping ring 15; the amount of local deformation depends primarily on the amount of force locally applied. (Step S5) While the forces are maintained, laser welding or other technique is applied to join part 15A of the clamping ring 15 to the outside of the mounting ring 11. In one preferred embodiment, laser welding is performed at multiple locations along the periphery of the lens unit, by directing a laser beam perpendicularly toward the first part 15A of the clamping ring 15, melting the material (preferably metal) at the interface between part 15A of the clamping ring 15 and the side of the mounting ring 11, thereby joining together the clamping ring 15 and mounting ring 11. The solid triangle shown on the right hand side of FIG. 2B and the solid triangle shown in FIG. 3 schematically illustrate a location where laser welding may be performed. The rear mounting ring 12, the rear membrane 14 and the rear clamping ring 16 can be assembled together in much the same manner.

In Step S4 of the above assembly process, the number of points along the periphery where forces are applied should be adequately dense. The mounting ring 11 maybe thin and somewhat flexible so the force applied at discrete points along the periphery may, if appropriate, cause the ring to deform slightly thereby taking an undulating shape. In an alternative embodiment, the force can be applied continuously along the entire periphery.

This assembling method is relatively simple, and can assure sealing without need for tight dimensional tolerances because the sealing effect is ensured by the compression of the flange portion 18A of the flexible seal, and the amount of compression is in turn determined by the forces applied to the mounting ring and the clamping ring before and while welding the rings together. This simple structure and assembly method results in lower cost of the lens unit. To the contrary, in existing lens units a precision step feature is provided between the mounting ring and the clamping ring, either as a part of the mounting ring or as a part of the clamping ring. The step feature determines the gap in which the flange of the flexible seal is located. This can be seen, for example, in U.S. Pat. Appl. Pub. No. 2008/0084532, FIGS. 3, 4, 5. This structure relies on achieving controlled amount of seal flange compression (not too little, not too much) by tightly controlling the dimensions of all relevant mechanical elements, in particular the step feature that define the size of the gap and the height of the flange. This may be referred to as "sealing-to-tolerance," and requires relatively high precision. The mounting structure and assembly method of the present embodiments described above, which may be referred to as "sealing-to-force," greatly relaxes dimensional requirements of the various parts of the lens unit. It also eliminates the need to use a step feature between the mounting ring and the clamping ring to define the gap size.

The flexible seal 18 is stretchable, in particular, in the middle portion 18C. In the zero diopter state shown in FIG. 2B, i.e. when the separation between the front and rear mounting rings 11 and 12 is the predetermined second distance, the middle portion 18C is in its as-molded state, and it is neither substantially stretched nor substantially deformed. In the negative diopter state shown in FIG. 2A, the separation of the two mounting rings 11 and 12 is larger than the predetermined second distance, and the middle portion 18C is stretched. In the positive diopter state shown in FIG. 2C, the separation of the two mounting rings 11 and 12 is smaller than the predetermined second distance, and the middle portion 18C is deformed via bending.

The adhesive bonding of the flanges 18A, 18B of the seal 18 to the respective mounting rings 11, 12 plays no direct role in preventing the flow of fluid into, or out of, the interior of the lens unit. Instead it serves to properly position the seal 18 within the lens unit, and to assure that each flange 18A/18B remains properly positioned notwithstanding the forces generated by stretching of the middle portion 18C in the negative diopter state (FIG. 2A). This is because the bonding of each flange portion to a mounting ring inhibits it from stretching as it would were it not bonded. Stretching of the flange portions is undesirable because it would cause these portions—which are clamped between the respective mounting ring and clamping ring—to thin and therefore possibly to slip out from between the rings. In existing lens units the mid-section of the flexible seal is always compressed, albeit to a varying extent; and hence the risk of a flange portion being stretched thin, and thereupon falling out of its groove, is very low. As a result, with existing FDLUs adhesive bonding of the flange portion to the mounting ring is not be necessary.

Figure 4:
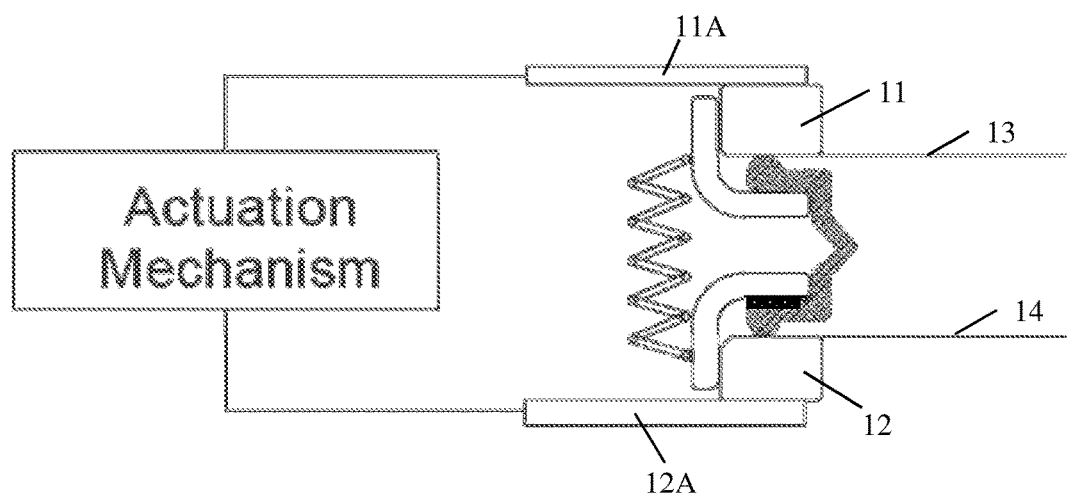

The pivoting movement of the front and rear mounting rings 11 and 12 with respect to each other is urged by an actuating mechanism. In one embodiment, the front ring assembly is fixedly coupled to the bridge of the spectacle, as shown in FIG. 4 (a magnified view similar to FIG. 3) where a portion of the bridge is shown as component 11A. On the rear ring assembly, a tab 12A is affixed to be engaged by the actuating mechanism. The location of the tab 12A along the periphery of the lens unit (i.e. the operating point) is close to where the front ring assembly is coupled to the bridge. Alternatively, the rear ring assembly may be fixedly coupled to the bridge of the spectacle and the front ring assembly may be provided with a tab to be engaged by the actuating mechanism. Hence the component 20, seen in FIG. 1, may be the tab 12A or a part of the bridge 11A.

The actuation mechanism, shown in a highly schematic manner in FIG. 4 as element 22, is mechanically engaged with both the bridge 11A and tab 12A to exert a compression force that urges the front and rear mounting rings 11 and 12 to move toward each other. The actuation mechanism has a manually controllable portion that allows the user to cause the actuation mechanism to generate a compression force or release it. Any suitable actuation mechanism may be used, including those shown in U.S. Pat. Nos. 6,053,610, 7,008,054, 8,888,276, 8,777,408, and 8,708,487 cited earlier.

A spring 17 is mechanically coupled to the front and rear ring assemblies. In the illustrated embodiment shown in FIGS. 2A-4, the spring 17 is a coil spring welded at each of its two ends, respectively, to the front and rear clamping rings 15 and 16 on parts 15A and 16A. The spring 17 is preferably located at a peripheral location close to the operating point (i.e. close to the tab on the front or rear ring assembly). In the zero diopter state shown in FIG. 2B, i.e. when the separation between the front and rear mounting rings 11 and 12 is the predetermined second distance, the spring 17 is in a partially compressed state. Thus, the spring 17 exerts a separation force which, in the absence of a compressing force exerted by the actuation mechanism 22, can push the front and rear mounting rings 11 and 12 to separate a specific desired distance farther from each other than in the zero diopter state. This is accomplished by overcoming both the force cause by the tension in the distended (concave) membranes and the restoring force caused by stretching the middle section of the flexible seal 18 (described in more detail later). As a result, when the actuation mechanism 22 does not exert a sufficient compressing force, the lens unit is in the negative diopter state (FIG. 2A) where the membranes 13, 14 are concave and the lens unit has a negative optical power. The spring is intended to be designed so that when its separation force is balanced by the opposite force generated by the distensible membranes 13, 14 and the flexible seal 18, the lens reaches its desired most negative optical power.

When the actuation mechanism 22 exerts a sufficient compression force, the front and rear ring assemblies are pressed toward each other, and the optical power of the lens unit becomes, as the situation dictates, either less negative or more positive. In the illustrated embodiment, the highest possible positive optical power is achieved when the front and rear clamping rings 15 and 16 come into contact with each other, as shown in FIG. 2C.

In a preferred embodiment, the various parameters of the lens unit are designed such that the highest positive optical power and the most negative optical power have approximately the same absolute value. In one example, the most negative optical power is −1.37 and the highest positive optical power is +1.37, providing a total optical range of approximately 2.75 diopter.

In FIGS. 2B and 3 the cross-sectional shape of seal 18 is shown in its as-molded state, i.e. when the seal is not under external deformational forces. In this state it has a ridge 18D, at or near the center of its middle portion 18C, which protrudes inwardly, i.e. toward the center of the lens unit. Because of this shape, when the seal 18 is compressed in the positive diopter state (FIG. 2C), the entire middle portion is deformed to protrude inwardly. Thus, the middle portion 18C does not fold into the space between the two clamping rings 15 and 16, and does not interfere with the two clamping rings coming into contact with each other in the maximum compressed state (corresponding to the highest positive diopter). This enables a uniquely thin lens unit.

The various structural features of the lens unit according to embodiments of the present invention are motivated by the considerations discussed below.

A primary goal of the lens units according to embodiments of this invention is to enable lens units of simple construction which can have substantially non-circular peripheral shape without that shape inherently inducing excessive optical distortion. From the study of applied mechanics, it is well understood that the shape of an inflated uniform membrane can be determined by solving Poisson's equation inclusive of the imposed boundary conditions. This understanding is directly relevant to FDLUs. In many existing FDLUs it has therefore been a goal to minimize unwanted optical distortion by establishing a membrane boundary which is i) very nearly perfectly circular, and ii) very nearly perfectly flat, and which maintains these attributes in use.

Studying solutions to Poisson's equation, as parametrized by inflation and ellipticity, the inventor of this invention has discovered that the extent to which boundary circularity and flatness need be achieved, and maintained, depends markedly on the magnitude of intended peak inflation. For example: for an existing unipolar lens unit with a minor diameter of about 40 mm and peak inflation corresponding to membrane curvature of +4.00 D, boundary ellipticity of 1.5 mm results in just over ¼ diopter of unwanted distortion. With a bipolar lens unit as disclosed in embodiments of the present invention, +2.75 D of optical ADD can be achieved with peak membrane inflation corresponding to only 1.37 D. Thus, correspondingly, similar distortion arises in the presence of more than 5 mm of ellipticity. Hence the invention enables a wide range of cosmetically appealing non-circular lens unit shapes to be used without engendering unacceptable levels of optical distortion.

Also, by limiting membrane curvature to a peak value of not more than about 1.4 D, internal pressure in the lens unit can be markedly less than in existing lens units having membranes of the identical thickness. In one example, the maximum force experienced by the mounting rings at the operating point decreases to about 0.15 lb at about 1.4 D, as compared to 0.5 lb at about 4.0 D. This reduced peak pressure leads directly to the suitability of thinner and lighter mounting rings to withstand adequately the forces and torques which arise in the lens unit operation To accommodate each user's far vision prescription, the adjustable focus spectacles may additionally include auxiliary prescription ophthalmic lenses.

In alternative embodiments, in lieu of the rear membrane 14, a thin transparent plate may be mounted on the rear mounting ring 12. In such a lens unit, when a separation between the front and rear mounting rings at the pivot location is a predetermined first distance, and a separation between the front and rear mounting rings at the operating point is a predetermined second distance, the lens unit is said to be in a zero diopter state if the front membrane is essentially flat, i.e., not substantially distended, neither convexly nor concavely. Just as in the two membrane case, when the lens unit is in its zero diopter state, the biasing element is partially compressed and exerts a separation force to urge a pivoting movement of the front and rear ring assemblies away from each other. The term "rear optical element" may be used generally to refer to either a rear membrane or a thin transparent plate mounted on the rear mounting ring.

It will be apparent to those skilled in the art that various modification and variations can be made in the adjustable focus spectacles of the present invention without departing from the spirit or scope of the invention. Thus, it is intended that the present invention cover modifications and variations that come within the scope of the appended claims and their equivalents.

What is claimed is:

1. A lens unit for variable focus spectacles, comprising:
a front ring assembly, including a front mounting ring, a front distensible membrane mounted on and bonded to the front mounting ring and covering an opening of the front mounting ring, and a front clamping ring affixed to the front mounting ring;
a rear ring assembly, including a rear mounting ring, a rear distensible membrane mounted on and bonded to the rear mounting ring and covering an opening of the rear mounting ring, and a rear clamping ring affixed to the rear mounting ring;
wherein the front and rear ring assemblies are disposed substantially parallel to a transverse direction of the lens unit and are pivotably coupled to each other at a pivot location located along a periphery of the lens unit;
a flexible seal, having a ring shape and disposed between the front and rear mounting rings along their peripheries;
an optical fluid filling a sealed space defined by the front and rear distensible membranes and the flexible seal; and
a biasing element, directly coupled to the front and rear ring assemblies at a peripheral location near or at an operating point located along the periphery of the lens unit and spaced apart from the pivot location,
wherein when a separation between the front and rear mounting rings at the pivot location is a predetermined first distance, and a separation between the front and rear mounting rings at the operating point is a predetermined second distance, the lens unit is in a zero diopter state where the front and rear membranes are flat and parallel to each other, and wherein when the lens unit is in the zero diopter state, the biasing element is in a partially compressed state and exerts a separation force to urge a pivoting movement of the front and rear ring assemblies away from each other.

2. The lens unit of claim 1, where the pivot location and the operation point are located substantially opposite each other with respect to a center of the lens unit.

3. The lens unit of claim 1, wherein the front and rear membranes are respectively mounted on surfaces of the front and rear mounting rings that face each other.

4. The lens unit of claim 1, wherein the front and rear membranes are formed of different materials and/or have different thicknesses.

5. The lens unit of claim 1, wherein the front and rear membranes are formed of same materials and the rear membrane is thicker than the front membrane.

6. The lens unit of claim 1, wherein the biasing element is a spring.

7. The lens unit of claim 1, wherein when the separation between the front and rear mounting rings at the pivot location is the predetermined first distance and the separation between them at the operating point is greater than the predetermined second distance, the lens unit is in a negative diopter state with the front and rear membranes distended inwardly forming concave shapes, and wherein when the separation between the front and rear mounting rings at the pivot location is the predetermined first distance and the separation between them at the operating point is less than the predetermined second distance, the lens unit is in a positive diopter state with the front and rear membranes distended outwardly forming convex shapes;
wherein the flexible seal has a first flange portion extending substantially in the transverse direction and compressed between the front mounting ring and the front clamping ring, a second flange portion extending substantially in the transverse direction and compressed between the rear mounting ring and the rear clamping ring, and a middle portion located between the first and second flange portions, and
wherein the middle portion of the flexible seal has an as-molded shape and is stretchable and deformable, wherein when the lens unit is in the zero diopter state, the middle portion is in approximately its as-molded shape, when the lens unit is in the negative diopter state, the middle portion is stretched from its as-molded shape, and when the lens unit is in the positive diopter state, the middle portion is deformed via bending.

8. The lens unit of claim 7, wherein the as-molded shape of the middle portion of the seal has an inwardly protruding ridge at or near a center of the middle portion.

9. A lens unit for variable focus spectacles, comprising:
a front ring assembly, including a front mounting ring, a front distensible membrane mounted on and bonded to the front mounting ring and covering an opening of the front mounting ring, and a front clamping ring affixed to the front mounting ring;
a rear ring assembly, including a rear mounting ring, a rear optical element mounted on and bonded to the rear mounting ring and covering an opening of the rear mounting ring, and a rear clamping ring affixed to the rear mounting ring;
wherein the front and rear ring assemblies are disposed substantially parallel to a transverse direction of the lens unit and are pivotably coupled to each other at a pivot location located along a periphery of the lens unit;
a flexible seal, having a ring shape and disposed between the front and rear mounting rings along their peripheries;
an optical fluid filling a sealed space defined by the front distensible membrane, the rear optical element and the flexible seal; and
a biasing element, directly coupled to the front and rear ring assemblies at a peripheral location near or at an operating point located along the periphery of the lens unit and spaced apart from the pivot location,
wherein when a separation between the front and rear mounting rings at the pivot location is a predetermined first distance, and a separation between the front and rear mounting rings at the operating point is a predetermined second distance, the lens unit is in a zero diopter state where the front membrane is flat, and wherein when the lens unit is in the zero diopter state, the biasing element is in a partially compressed state and exerts a separation force to urge a pivoting movement of the front and rear ring assemblies away from each other.

10. The lens unit of claim 9, where the pivot location and the operation point are located substantially opposite each other with respect to a center of the lens unit.

11. The lens unit of claim 9, wherein the biasing element is a spring.

12. The lens unit of claim 9, wherein when the separation between the front and rear mounting rings at the pivot location is the predetermined first distance and the separation between them at the operating point is greater than the predetermined second distance, the lens unit is in a negative diopter state with the front membrane distended inwardly forming a concave shape, and wherein when the separation between the front and rear mounting rings at the pivot location is the predetermined first distance and the separation between them at the operating point is less than the predetermined second distance, the lens unit is in a positive diopter state with the front membrane distended outwardly forming a convex shape;
wherein the flexible seal has a first flange portion extending substantially in the transverse direction and compressed between the front mounting ring and the front clamping ring, a second flange portion extending substantially in the transverse direction and compressed between the rear mounting ring and the rear clamping ring, and a middle portion located between the first and second flange portions, and
wherein the middle portion of the flexible seal has an as-molded shape and is stretchable and deformable, wherein when the lens unit is in the zero diopter state, the middle portion is in approximately its as-molded shape, when the lens unit is in the negative diopter state, the middle portion is stretched from its as-molded shape, and when the lens unit is in the positive diopter state, the middle portion is deformed via bending.

13. The lens unit of claim 12, wherein the as-molded shape of the middle portion of the seal has an inwardly protruding ridge at or near a center of the middle portion.

* * * * *